US012652324B2

(12) United States Patent
Grover et al.

(10) Patent No.: US 12,652,324 B2
(45) Date of Patent: Jun. 9, 2026

(54) METHODS, SYSTEMS, AND COMPUTER READABLE MEDIA FOR PRESERVING NETWORK BANDWIDTH DURING NETWORK ADDRESS TRANSLATION (NAT) DEVICE UNAVAILABILITY OR AFTER NAT DEVICE REBOOT

(71) Applicant: Oracle International Corporation, Redwood Shores, CA (US)

(72) Inventors: Lalit Grover, Haryana (IN); Vimal Chandra Tewari, Bangalore (IN); Jayesh Shrimali, Telangana (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 130 days.

(21) Appl. No.: 18/402,359

(22) Filed: Jan. 2, 2024

(65) Prior Publication Data

US 2025/0220057 A1      Jul. 3, 2025

(51) Int. Cl.
| | |
|---|---|
| *H04L 65/1073* | (2022.01) |
| *H04L 61/256* | (2022.01) |
| *H04L 65/1045* | (2022.01) |

(52) U.S. Cl.
CPC ........ *H04L 65/1073* (2013.01); *H04L 61/256* (2013.01); *H04L 65/1045* (2022.05)

(58) Field of Classification Search
CPC ............. H04L 65/1073; H04L 65/1045; H04L 61/256
See application file for complete search history.

(56) References Cited

U.S. PATENT DOCUMENTS

| | | | |
|---|---|---|---|
| 7,483,437 B1 * | 1/2009 | Mohaban | .............. H04L 63/029 370/411 |
| 7,515,549 B2 | 4/2009 | Wing et al. | |
| 7,760,744 B1 * | 7/2010 | Mohaban | .............. H04L 63/029 370/392 |
| 8,023,432 B2 | 9/2011 | Herzog | |
| 9,692,724 B2 | 6/2017 | Chien | |

(Continued)

OTHER PUBLICATIONS

Cheshire, et al., "NAT Port Mapping Protocol (NAT-PMP)", RFC 6886 (Apr. 2013).

(Continued)

*Primary Examiner* — Abdelbasst Talioua
(74) *Attorney, Agent, or Firm* — Jenkins, Taylor & Hunt, P.A.

(57)      ABSTRACT

A method for preserving network bandwidth during NAT device unavailability or after a NAT device reboot includes receiving, by a session initiation protocol (SIP) proxy, messages from SIP endpoints, determining, by the SIP proxy, that at least some of the SIP endpoints are located behind a NAT device. The method further includes determining, by the SIP proxy, that the NAT device is potentially unavailable or has potentially rebooted, testing, by the SIP proxy, reachability of at least some of the SIP endpoints located behind the NAT device and determining that the at least some of the SIP endpoints are unreachable, classifying, by the SIP proxy, all of the SIP endpoints located behind the NAT device as unreachable, and rejecting, by the SIP proxy, SIP messages directed towards the SIP endpoints located behind the NAT device.

20 Claims, 8 Drawing Sheets

(56) References Cited

U.S. PATENT DOCUMENTS

| 10,819,755 | B1 * | 10/2020 | Asveren | H04L 61/2589 |
| 11,838,259 | B1 * | 12/2023 | Liu | H04L 61/2503 |
| 12,243,525 | B1 * | 3/2025 | Oliver | H04L 65/1069 |
| 2004/0024879 | A1 * | 2/2004 | Dingman | H04L 63/0281 |
| | | | | 709/227 |
| 2007/0253418 | A1 * | 11/2007 | Shiri | H04L 67/14 |
| | | | | 370/392 |
| 2010/0034194 | A1 * | 2/2010 | Fieremans | A61P 31/04 |
| | | | | 370/352 |
| 2010/0161809 | A1 * | 6/2010 | Roach | H04L 63/029 |
| | | | | 709/227 |
| 2012/0166656 | A1 * | 6/2012 | Asveren | H04L 63/029 |
| | | | | 709/228 |
| 2013/0054762 | A1 * | 2/2013 | Asveren | H04L 61/2553 |
| | | | | 709/220 |
| 2015/0023251 | A1 * | 1/2015 | Giakoumelis | H04L 65/1063 |
| | | | | 370/328 |
| 2015/0222601 | A1 * | 8/2015 | Metz | H04L 63/0823 |
| | | | | 726/5 |
| 2016/0156531 | A1 * | 6/2016 | Cartwright | G06F 16/686 |
| | | | | 455/423 |
| 2017/0251062 | A1 * | 8/2017 | Lu | H04L 63/166 |
| 2019/0037518 | A1 * | 1/2019 | Russell | H04L 65/1016 |
| 2019/0149583 | A1 * | 5/2019 | Jutila | H04L 65/1063 |
| | | | | 455/435.1 |
| 2019/0281021 | A1 * | 9/2019 | Asveren | H04L 63/0236 |
| 2020/0259794 | A1 * | 8/2020 | Asveren | H04L 63/0236 |

OTHER PUBLICATIONS

"Policies Configuration Guide for vEdge Routers, Cisco SD-WAN Releases 19.1, 19.2, and 19.3" CISCO (2019).
Guduru, et al., "Queuing Strategies for Self Overload Control in SIP Servers", IEEE, pp. 1007-1011 (2014).
Kabir, "Security Mechanisms for a Cooperative Firewall", Aalto University (2014).
"Configuring the SIP proxy for network outage detection", IBM Documentation (2022).
"SIP message to reboot or resync", CISCO community (2012).
"Stream Control Transfer Protocol Overview", ACLI Configuration Guide, Oracle (2013).
Rosenberg et al., SIP: Session Initiation Protocol, IETF RFC 3261 (Jun. 2002).

* cited by examiner

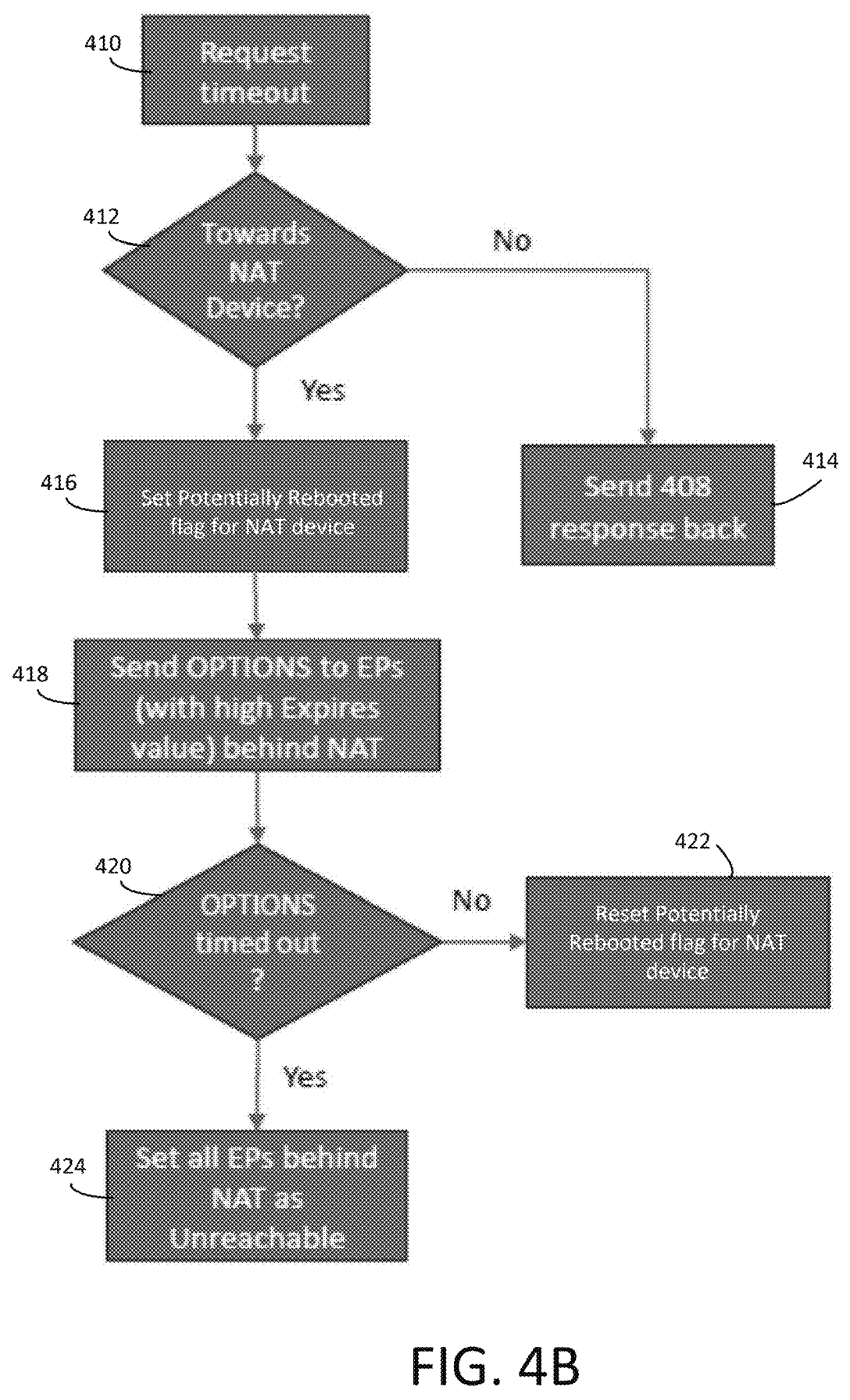

410 — Request timeout

412 — Towards NAT Device?

No → 414 — Send 408 response back

Yes

416 — Set Potentially Rebooted flag for NAT device

418 — Send OPTIONS to EPs (with high Expires value) behind NAT

420 — OPTIONS timed out ?

No → 422 — Reset Potentially Rebooted flag for NAT device

Yes

424 — Set all EPs behind NAT as Unreachable

FIG. 4B

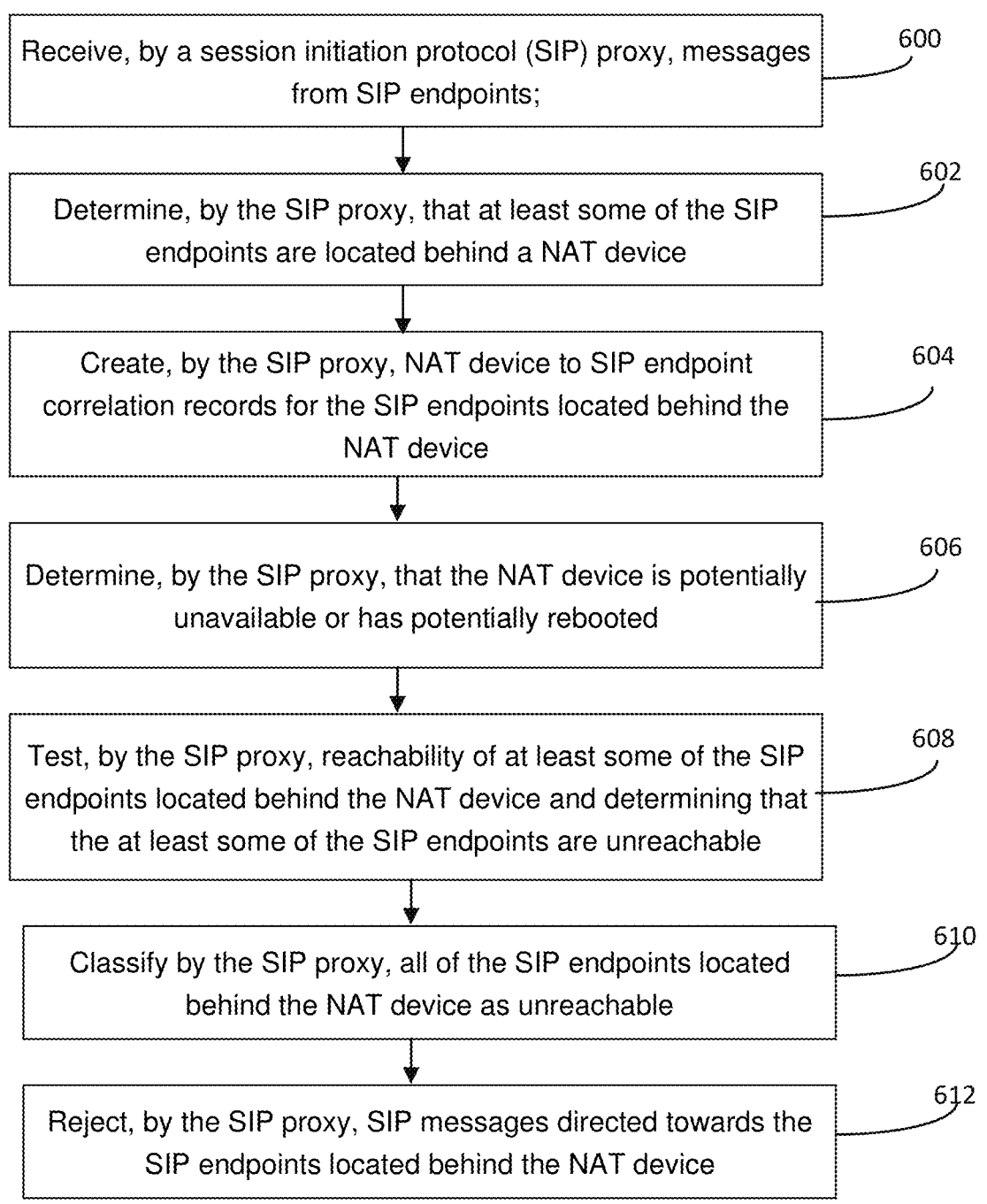

Receive, by a session initiation protocol (SIP) proxy, messages from SIP endpoints;                    600

Determine, by the SIP proxy, that at least some of the SIP endpoints are located behind a NAT device                    602

Create, by the SIP proxy, NAT device to SIP endpoint correlation records for the SIP endpoints located behind the NAT device                    604

Determine, by the SIP proxy, that the NAT device is potentially unavailable or has potentially rebooted                    606

Test, by the SIP proxy, reachability of at least some of the SIP endpoints located behind the NAT device and determining that the at least some of the SIP endpoints are unreachable                    608

Classify by the SIP proxy, all of the SIP endpoints located behind the NAT device as unreachable                    610

Reject, by the SIP proxy, SIP messages directed towards the SIP endpoints located behind the NAT device                    612

FIG. 6

METHODS, SYSTEMS, AND COMPUTER READABLE MEDIA FOR PRESERVING NETWORK BANDWIDTH DURING NETWORK ADDRESS TRANSLATION (NAT) DEVICE UNAVAILABILITY OR AFTER NAT DEVICE REBOOT

TECHNICAL FIELD

The subject matter described herein relates to managing communications with session initiation protocol (SIP) endpoints located behind a NAT device. More particularly, the subject matter described herein relates to methods, systems, and computer readable media for preserving network bandwidth during NAT device unavailability or after a NAT device reboot.

BACKGROUND

Network address translation (NAT) is a technique commonly used by Internet service providers (ISPs) and organizations to enable multiple devices to share a single public Internet protocol (IP) address. By using NAT, devices on a private network can communicate with devices on a public network without the need for each device on the private network to have its own unique public IP address. The private IP addresses of the devices on the private network can remain hidden from devices on the public network, which may be important for network security.

Network address translation is very common in real-time voice over IP (VOIP) communication, whether the communication is for voice, video, or other data sessions. NAT enables end-to-end communication across private and public networks. The NAT function enables two-way communication between a SIP client and a SIP server by translating the private IP/Port address into a public IP/Port and storing the mapping between the two, also known as a pinhole or binding. A server located on the public side of the NAT device can use this public IP/port to reach a client on a private network through the NAT device for as long as the pinhole is open (i.e., the binding exists) on the NAT device. These bindings are typically created when a client in the private network initiates a request towards a server in the public network. The binding stays in the NAT translations table for as long as the packets are exchanged between the two entities.

Typical NAT device implementations cause the binding entry to time out after a period of inactivity, and the public IP/port address is then made available for reuse for new translations. After a binding gets deleted, the NAT device would drop the packets destined for clients mapped to the deleted binding. In some cases, if the public IP/port is reused for a new binding with a different client, the NAT device may also misroute the packets meant for the original client.

Since a SIP proxy is unaware of the binding expiry times, there are various functionalities built into SIP proxies to ensure persistent reachability towards SIP user agents located in a private network behind a NAT device and/or a firewall. Hosted NAT traversal (HNT) is one such technique that relies on frequent messaging to ensure that the bindings on the intermediary NAT device are not torn down because of inactivity.

There are many variations of HNT functionality which make them suitable and optimized for most situations, but they do not help in a NAT reboot scenario. If the NAT device loses the translation rules/bindings due to a restart, the endpoints (hereinafter, also referred to as EPs) would become unreachable and remain so until they send the next packet thereby creating a new binding at the NAT device. This window can vary from a few seconds to a few days depending on many factors.

During this window when the endpoints behind a NAT device are unreachable, all new sessions initiated towards those endpoints would fail since the NAT device would not find a matching translation rule to route the signaling packets to the intended endpoints and would consequently drop the packets. Even the existing sessions would get impacted since their signaling/media packets would not reach the endpoints. This would further lead to retransmissions, causing additional burden on the network. Routing such packets towards the NAT device is an unnecessary overhead on the network bandwidth and resources since these packets are destined to get dropped eventually. This problem is further aggravated if there are many endpoints behind the NAT device.

In light of these and other difficulties, there exists a need for improved methods, systems, and computer readable media for preserving network bandwidth during NAT device unavailability or after an NAT reboot.

SUMMARY

A method for preserving network bandwidth during network address translation (NAT) device unavailability or after a NAT device reboot includes receiving, by a session initiation protocol (SIP) proxy, messages from SIP endpoints. The method further includes determining, by the SIP proxy, that at least some of the SIP endpoints are located behind a NAT device. The method further includes creating, by the SIP proxy, NAT device to SIP endpoint correlation records for the SIP endpoints located behind the NAT device. The method further includes determining, by the SIP proxy, that the NAT device is potentially unavailable or has potentially rebooted. The method further includes testing, by the SIP proxy, reachability of at least some of the SIP endpoints located behind the NAT device and determining that the at least some of the SIP endpoints are unreachable. The method further includes classifying, by the SIP proxy, all of the SIP endpoints located behind the NAT device as unreachable. The method further includes rejecting, by the SIP proxy, SIP messages directed towards the SIP endpoints located behind the NAT device.

According to another aspect of the subject matter described herein, receiving messages from SIP endpoints includes receiving SIP REGISTER request messages from SIP endpoints.

According to another aspect of the subject matter described herein, determining that at least some of the SIP endpoints are located behind the NAT device includes comparing source Internet protocol (IP) addresses in layer 3 packets carrying the SIP REGISTER request messages to IP addresses in first SIP Via headers of the SIP REGISTER request messages, and determining that the source IP addresses in the layer 3 packets carrying the SIP REGISTER request messages do not match the IP addresses in the first SIP Via headers of the SIP REGISTER request messages.

According to another aspect of the subject matter described herein, creating the NAT device to SIP endpoint correlation records includes inserting, in each of the records, a layer 3 source IP address of a packet carrying a SIP message, a layer 4 source port number from the packet carrying the SIP message, an IP address, a port number, and a SIP instance ID from a Contact header of the SIP message, and a call ID. According to another aspect of the subject matter described herein, determining that the NAT device is potentially unavailable or has potentially rebooted includes: sending a message to one of the SIP endpoints located behind the NAT device and failing to receive a response to the message within a timeout period; and, in response to failing to receive a response to the message within the timeout period, determining that the NAT device is potentially unavailable or has potentially rebooted.

According to another aspect of the subject matter described herein, determining that the NAT device is potentially unavailable or has potentially rebooted includes: receiving a SIP REGISTER request message from one of the SIP endpoints located behind the NAT, using information from the SIP REGISTER request message to locate a NAT device to SIP endpoint correlation record or an entry for the one endpoint in a SIP registration cache, and determining that information in the SIP REGISTER request does not match information in the NAT device to SIP endpoint correlation record or the entry for the one endpoint in the SIP registration cache.

According to another aspect of the subject matter described herein, using the information from the SIP REGISTER request message to locate a NAT device to SIP endpoint correlation record or the entry for the one endpoint in the SIP registration cache includes using a layer 4 source port of a packet carrying the SIP REGISTER request message or a call ID in the SIP REGISTER request message to locate the NAT device to SIP endpoint correlation record or the entry for the one endpoint in the SIP registration cache, determining that the call ID in the SIP register request message matches a call ID in the NAT device to SIP endpoint correlation record or the entry for the one endpoint in the SIP registration cache, and determining that the information in the SIP REGISTER request does not match the information in the NAT device to SIP endpoint correlation record or the entry for the one endpoint in the SIP registration cache includes determining that a SIP instance identifier or an IP address and port number in a SIP Contact header of the SIP REGISTER request message does not match a SIP instance identifier or an IP address and a port number in the NAT device to SIP endpoint correlation record or the entry for the one endpoint in the SIP registration cache.

According to another aspect of the subject matter described herein, testing the reachability of at least some of the SIP endpoints located behind the NAT device includes transmitting SIP OPTIONS request messages to at least some of the SIP endpoints located behind the NAT device, and determining that the NAT is unavailable in response to detecting timeouts associated with the SIP OPTIONS request messages.

According to another aspect of the subject matter described herein, rejecting SIP messages directed to the SIP endpoints located behind the NAT device includes refraining from forwarding the SIP messages to the NAT device; and generating and send SIP error response messages to originators of the SIP messages and include, in each of the SIP error response messages, a Retry-After header carrying a time value determined by the SIP proxy based on a registration refresh interval.

According to another aspect of the subject matter described herein, the SIP proxy comprises a session border controller (SBC).

According to another aspect of the subject matter described herein, a system for preserving network bandwidth during network address translation (NAT) device unavailability or after a NAT device reboot is provided. The system includes a session initiation protocol (SIP) proxy including at least one processor and a memory. The system further includes a NAT device to SIP endpoint correlation manager implemented by the at least one processor for receiving messages from SIP endpoints, determining that at least some of the SIP endpoints are located behind a NAT device, determining that the NAT device is potentially unavailable or has potentially rebooted, testing reachability of at some of the SIP endpoints located behind the NAT device and determining that the at least some of the SIP endpoints are unreachable, classifying of the SIP endpoints located behind the NAT device as unreachable, and rejecting SIP messages directed towards the SIP endpoints located behind the NAT device.

According to another aspect of the subject matter described herein, the messages from SIP endpoints comprise SIP REGISTER request messages from SIP endpoints.

According to another aspect of the subject matter described herein, in determining that at least some of the SIP endpoints are located behind the NAT device, the NAT device to SIP endpoint correlation manager is configured to compare source Internet protocol (IP) addresses in layer 3 packets carrying the SIP REGISTER request messages to IP addresses in first SIP Via headers of the SIP REGISTER request messages, and determine that the source IP addresses in the layer 3 packets carrying the SIP REGISTER request messages do not match the IP addresses in the first SIP Via headers of the SIP REGISTER request messages.

According to another aspect of the subject matter described herein, the NAT device to SIP endpoint correlation manager is configured to create NAT device to SIP endpoint correlation records and insert, in each of the records, a layer 3 source IP address from a packet carrying a SIP message, a layer 4 source port number from the packet carrying the SIP message, an IP address, a port number, and a SIP instance ID from a Contact header of the SIP message, and a call ID.

According to another aspect of the subject matter described herein, in determining that the NAT device is potentially unavailable or has potentially rebooted, the NAT device to SIP endpoint correlation manager is configured to send a message to one of the SIP endpoints located behind the NAT device and failing to receive a response to the message within a timeout period, and in response to failing to receive a response to the message within the timeout period, determine that the NAT device is potentially unavailable or has potentially rebooted.

According to another aspect of the subject matter described herein, in determining that the NAT device is potentially unavailable or has potentially rebooted, the NAT device to SIP endpoint correlation manager is configured to receive a SIP REGISTER request message from one of the SIP endpoints located behind the NAT, use information from the SIP REGISTER request message to locate a NAT device to SIP endpoint correlation record or an entry for the one endpoint in the SIP registration cache, and determine that information in the SIP REGISTER request does not match information in the NAT device to SIP endpoint correlation record or the entry for the one endpoint in the SIP registration cache.

According to another aspect of the subject matter described herein, in testing the reachability of at least some of the SIP endpoints located behind the NAT device, the NAT device to SIP endpoint correlation manager is configured to transmit SIP OPTIONS request messages to at least some of the SIP endpoints located behind the NAT device, and determine that the NAT is unavailable in response to detecting timeouts associated with the SIP OPTIONS request messages.

According to another aspect of the subject matter described herein, in rejecting SIP messages directed to the SIP endpoints located behind the NAT device, the NAT device to SIP endpoint correlation manager is configured to: refrain from forwarding the SIP messages to the NAT device and generate and send SIP error response messages to originators of the SIP messages and include, in each of the SIP error response messages, a Retry-After header carrying a time value determined by the SIP proxy based on a registration refresh interval.

According to another aspect of the subject matter described herein, a non-transitory computer readable medium having stored thereon executable instructions that when executed by a processor of a computer control the computer to perform steps is provided. The steps include receiving, by a session initiation protocol (SIP) proxy, messages from SIP endpoints. The steps further include determining, by the SIP proxy, that at least some of the SIP endpoints are located behind a network address translation (NAT) device. The steps further include determining, by the SIP proxy, that the NAT device is potentially unavailable or has potentially rebooted. The steps further include testing, by the SIP proxy, reachability of at least some of the SIP endpoints located behind the NAT device and determining that the at least some of the SIP endpoints are unreachable. The steps further include classifying, by the SIP proxy, all of the SIP endpoints located behind the NAT device as unreachable. The steps further include rejecting, by the SIP proxy, SIP messages directed towards the SIP endpoints located behind the NAT device.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which:

FIG. 4B is a flow chart illustrating an exemplary process performed by a SIP proxy in detecting a reboot or unavailability of the NAT device;

FIG. 6 is a flow chart illustrating an exemplary process performed by a SIP proxy in preserving network bandwidth during unavailability of a NAT device or after a reboot of a NAT device.

DETAILED DESCRIPTION

As indicated above, one problem that can occur when a NAT device reboots or is unavailable is that SIP nodes on the public side of the NAT device may continue to send messages to SIP endpoints located on the private side of the NAT device and the messages will fail. Such messaging wastes network bandwidth and should be limited or avoided. The subject matter described herein includes a SIP proxy that identifies SIP endpoints located behind a NAT device, detects when the NAT device has rebooted or become unavailable, and limits unnecessary signaling with the endpoints located behind the NAT device after the reboot or during the period of unavailability. The terms "located behind the NAT device" and "on the private or protected side of the NAT device" are used interchangeably herein.

Figure 1:
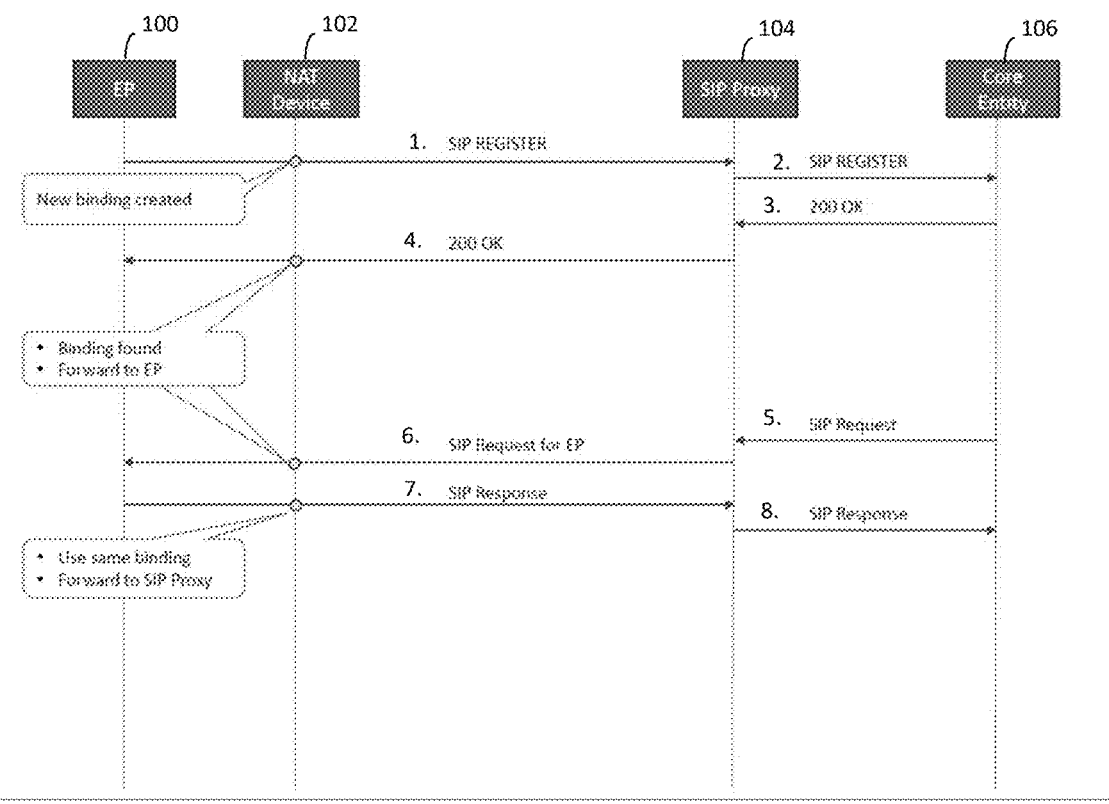
FIG. 1 is a message flow diagram illustrating exemplary messages exchanged among SIP endpoints located on the private side of a NAT device, SIP endpoints located on the public side of a NAT device, and a SIP proxy.

FIG. 1 is a message flow diagram illustrating exemplary messages exchanged among SIP endpoints located on the private side of a NAT device, SIP endpoints located on the public side of the NAT device, and a SIP proxy. Referring to FIG. 1, a SIP endpoint 100 is located behind a NAT device 102. A SIP proxy 104 and a core network entity 106, which may be another SIP endpoint, is located on the public or unprotected side of NAT device 102. In step 1, SIP endpoint 100 located on the private side of NAT device 102 sends a SIP REGISTER request message to core network entity 106. NAT device 102 receives the SIP REGISTER request message and creates a binding between the private source IP address and source port used by SIP endpoint 100 and a public IP address and port number assigned by NAT device 102. NAT device 102 receives the SIP REGISTER request, reads the source IP address and the source port number from the packet carrying the SIP REGISTER request and assigns a public IP address and port number combination to the endpoint. NAT device 102 creates and stores a binding between the private source IP address and the private source port number and the public IP address and public source port number. Before transmitting the egress message to the public network, NAT device 102 replaces the private source IP address and source port number with the assigned public IP address and port number. Table 1 shown below illustrates an example of binding information that NAT device 102 can maintain for an endpoint located behind NAT device 102.

TABLE 1

| Example Binding Information Maintained by NAT Device | | | |
|---|---|---|---|
| Private Layer 3 IP address | Private Layer 4 Port Number | Public Layer 3 IP address | Public Layer 4 Port Number |
| IP1 | Port1 | IP2 | Port2 |

In Table 1, IP1 and Port1 are private values that are not used on the public side of the NAT device. IP2 and Port2 are the public values used on the public side of the NAT device. IP2 may be used by the NAT device as the public IP address for all outbound request messages sent on the public network. A unique port number may be used to identify each registered endpoint on the private side of the NAT device. The references to layers in Table 1 and elsewhere in this document refer to open systems interconnect (OSI) layers where layer 3 is the network layer and layer 4 is the transport layer.

SIP proxy 104 receives the SIP REGISTER request from NAT device 102, and, in step 2, forwards the SIP REGISTER request to core network entity 106. In step 3, core network entity 106 responds to the SIP REGISTER request in step 2 by sending a 200 OK message to SIP proxy 104. In step 4, SIP proxy 104 responds to the SIP REGISTER request in step 1 by sending a 200 OK message to SIP endpoint 100. The destination IP address and destination port number in the packet used to carry the 200 OK message are those assigned by NAT device 102. NAT device 102 receives the 200 OK message, locates the binding corresponding to SIP endpoint 100, replaces the destination public IP address and destination port number in the IP packet carrying the message with the private IP address and port number of SIP endpoint 100 and forwards the 200 OK message to SIP endpoint 100.

In step 5, core network entity 106 sends a SIP request to SIP endpoint 100. NAT device 102 receives the SIP request, locates the binding, refreshes the binding expiration timer associated with the binding, replaces the destination IP address and port number in the IP packet carrying the SIP request, and, in step 6, forwards the SIP request to SIP endpoint 100. In step 7, SIP endpoint 100 sends a SIP response to SIP proxy 104. NAT device 102 receives the response, uses the binding to replace the source IP address and source port number in the IP packet carrying the message and forwards SIP response to SIP proxy 104. In step 8, SIP proxy 104 forwards the response to core network entity 106.

Figure 2:
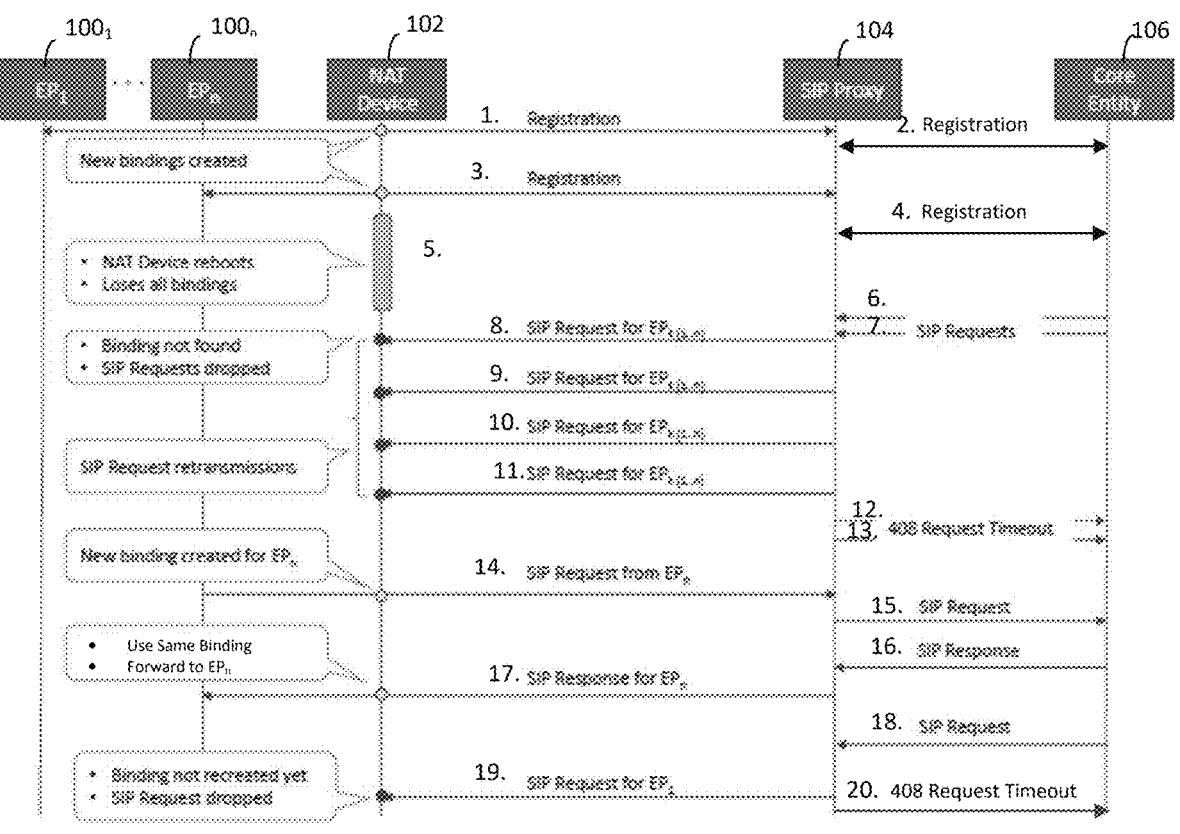
FIG. 2 is a message flow diagram illustrating exemplary messages exchanged among SIP endpoints located on the private side of a NAT device, SIP endpoints located on the public side of a NAT device, and a SIP proxy both before and after a NAT device reboot occurs.

FIG. 2 is a message flow diagram illustrating exemplary messages exchanged among SIP endpoints located on the private side of a NAT device, SIP endpoints located on the public side of a NAT device, and a SIP proxy, both before and after a NAT device reboot occurs. Referring to FIG. 2, in steps 1-4, SIP endpoints $100_1$-$100_n$ initiate SIP registration exchanges with core network entity 106. The result of the SIP registration exchanges is the creation of bindings by NAT device 102.

In step 5 of the message flow diagram, NAT device 102 reboots and loses all of its bindings. The reason that the bindings are lost is because bindings are typically stored in non-persistent memory and are lost when a reboot or loss of power occurs. Core network entity 106 is not aware that the NAT device 102 has rebooted. Accordingly, in steps 6 and 7, core network entity 106 sends SIP requests to SIP endpoints $100_1$-$100_n$ located behind NAT device 102. SIP Proxy 104 receives the SIP requests and, in steps 8-11, forwards the requests to NAT device 102. Because the SIP requests have IP addresses and port numbers associated with bindings that are no longer maintained by NAT device 102, NAT device 102 does not forward the SIP requests, and SIP proxy 104 determines that request timeouts occur. In steps 12 and 13, SIP proxy 104 communicates request timeout messages to core network entity 106. The signaling in steps 6-13 wastes network bandwidth and should be avoided or at least limited.

In step 14, one of the endpoints located behind NAT device 102 sends a new SIP request to core network entity 106. NAT device 102 receives the SIP request and creates a new binding for the endpoint. In step 15, SIP proxy 104 sends the SIP request to core network entity 106. In step 16, core network entity 106 generates and sends to SIP proxy 104 a response to the SIP request. In step 17, SIP proxy 104 forwards the response to endpoint $100_n$ via NAT device 102, which uses the previously created binding to communicate the SIP response to SIP endpoint $100_n$.

In step 18, core network entity 106 sends a SIP request to endpoint $100_1$ located behind NAT device 102 but for which NAT device 102 has not created a new binding. In step 19, SIP proxy 104 sends the SIP request for endpoint $100_1$ to NAT device 102. Because NAT device 102 has not yet created a new binding for endpoint $100_1$, the SIP request times out, and SIP proxy 104 determines that a timeout has occurred. In step 20, SIP proxy 104 sends a 408 request timeout message to core network entity 106. The signaling illustrated in steps 18-20 wastes network bandwidth and should be avoided or at least limited.

Figure 3:
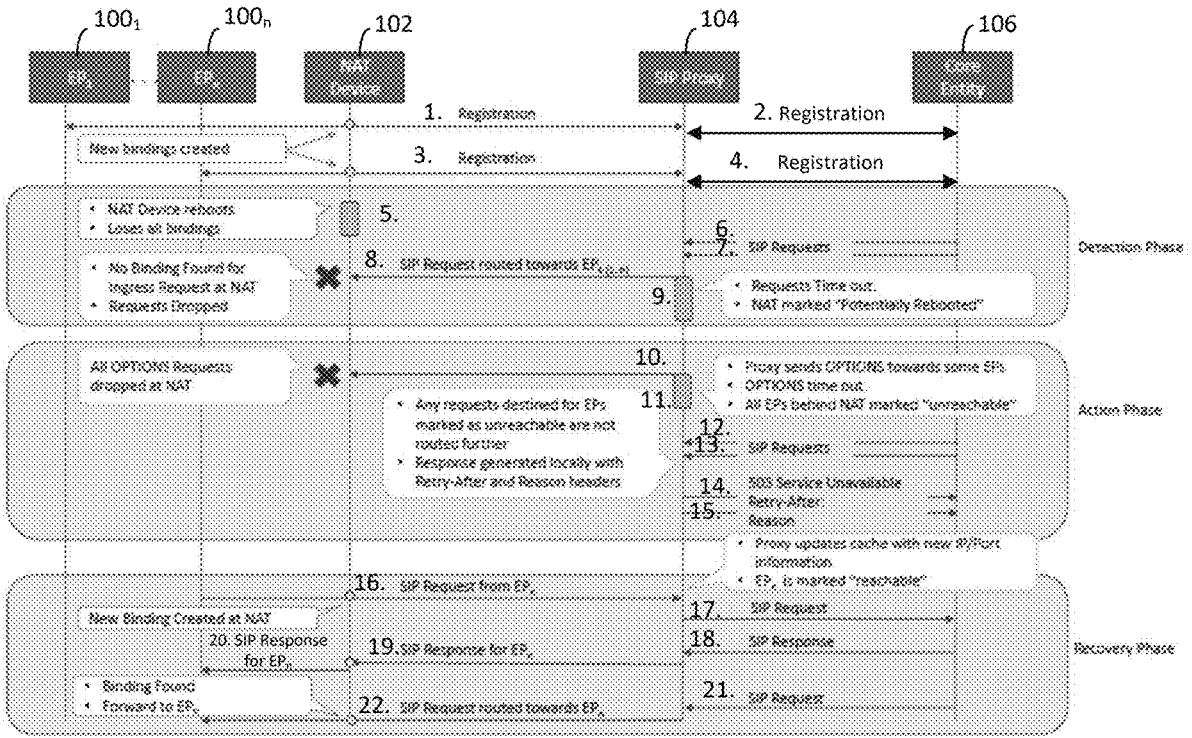
FIG. 3 is a message flow diagram illustrating exemplary messages exchanged among SIP endpoints located on the private side of a NAT device, SIP endpoints located on a public side of a NAT device, and a SIP proxy, both before and after a NAT device reboot occurs, where the SIP proxy operates to preserve network bandwidth after the NAT device reboot occurs.

FIG. 3 is a message flow diagram illustrating exemplary messages exchanged among SIP endpoints located on the private side of a NAT device, SIP endpoints located on a public side of a NAT device, and a SIP proxy both before and after a NAT device reboot occurs, where the SIP proxy operates to preserve network bandwidth after the NAT device reboot occurs. Referring to FIG. 3, in steps 1-4, SIP endpoints $100_1$-$100_n$ implement SIP registration exchanges through with core network entity 106. NAT device 102 creates binding records for the SIP endpoints located behind NAT device 102 based on the registration requests. In one example, SIP proxy 104 creates correlation records for the SIP endpoints located behind NAT device 102. Table 2 illustrates an example of information that may be included in the NAT device to SIP endpoint correlation records for the SIP endpoints located behind NAT device 102.

TABLE 2

| Example NAT device to SIP endpoint Correlation Record Created by SIP Proxy for Endpoint Behind NAT Device | | | | | | |
|---|---|---|---|---|---|---|
| Layer 3 Source IP | Layer 4 Source Port | SIP Contact Header IP/Port | SIP Instance ID | CALL ID | NAT Potentially Rebooted | Endpoint Reachability |
| IP2 | Port2 | IP3/Port3 | UA1 | Call1 | No | Yes |

In Table 2, the NAT device to SIP endpoint correlation record includes the layer 3 source IP address and the layer 4 source port number, which for endpoints located behind a NAT device, are the public IP address of the NAT device and the public layer 4 source port number used by the NAT device to identify the endpoint. The SIP Contact header IP address and port is an IP address and port number inserted by the SIP endpoint in the SIP Contact header of the SIP REGISTER request message. The SIP instance ID is an identifier inserted by the SIP user agent running on the SIP endpoint that created the SIP REGISTER request. The call ID is a parameter that uniquely identifies a call. The NAT potentially rebooted value is a flag maintained by SIP proxy 104 to indicate whether the NAT device has potentially rebooted or is unavailable. The endpoint reachability value is a flag maintained by SIP proxy 104 to indicate whether or not the SIP endpoint is reachable.

In another example, rather than creating and storing NAT device to SIP endpoint correlation records, SIP proxy 104 may access the same information stored in columns 1-4 of Table 2 from a SIP registration cache maintained by SIP proxy for registered SIP endpoints. SIP proxy 104 may utilize a registration cache entry for a registered SIP endpoint to determine whether the endpoint is behind a NAT and whether the endpoint is reachable in the same manner as describe herein using NAT device to SIP endpoint correlation records.

In one example, SIP proxy 104 may determine that an endpoint is behind a NAT device by comparing the layer 3 source IP address with the IP address in the first SIP Via header of the SIP REGISTER request message. If the layer 3 source IP address does not match the IP address in the first SIP Via header, SIP proxy 104 may determine that the endpoint identified in the SIP REGISTER request is located behind a NAT device.

In step 5, NAT device 102 reboots and loses all of its binding records. In steps 6 and 7, core network entity 106 initiate SIP requests towards the endpoints located behind NAT device 102. The requests time out, and SIP proxy 104 identifies NAT device 102 has potentially rebooted or is unavailable. Another method by which SIP proxy 104 may determine that NAT device 102 has rebooted is if SIP proxy 104 receives a SIP REGISTER request from one of SIP endpoints $100_1$-$100_n$ with binding information that does not match an existing NAT device to SIP endpoint correlation record or registration cache entry for the same endpoint stored by SIP proxy 104. To make this determination, SIP proxy 104 may examine the layer 4 source port and IP address in the packet that carries the SIP REGISTER request. The layer 3 IP address identifies NAT device 102. The layer 4 source port is uniquely assigned to the endpoint by NAT device 102. SIP proxy 104 may obtain endpoint identifying information from the SIP REGISTER request. In one example, the endpoint identifying information may be the IP address and port number or the instance ID obtained from the Contact header of the SIP REGISTER request. If SIP proxy 104 determines that the layer 3 source IP address and layer 4 source port are assigned to a different endpoint or that the same endpoint is assigned to the same layer 3 source IP address and a different layer 4 source port and the call ID in the REGISTER request matches to call ID in the correlation record or registration cache entry, SIP proxy 104 may determine that NAT device 102 has potentially rebooted. If the call ID does not match the call ID in the record, SIP proxy 104 may determine that the endpoint, rather than NAT device 102, has restarted.

After marking NAT device 102 as potentially rebooted or unavailable, SIP proxy 104 tests NAT device 102 to confirm that NAT device 102 has rebooted or is unavailable by sending, in step 10, SIP OPTIONS request messages directed to at least some of SIP endpoints $100_1$-$100_n$ located behind NAT device 102. Because NAT device 102 has rebooted and does not store bindings for SIP endpoints $100_1$-$100_n$, NAT device 102 is unable to forward the SIP OPTIONS request messages to SIP endpoints $100_1$-$100_n$. As a result, the SIP OPTIONS transactions time out. In response to detecting timeout events for the SIP OPTIONS transactions, SIP proxy 104 marks all endpoints located behind NAT device 102 as unreachable, as indicated by step 11.

In steps 12 and 13, core network entity 106 transmits SIP requests directed to SIP endpoints $100_1$-$100_n$ via SIP proxy 104. Rather than forwarding the SIP requests, SIP proxy 104 rejects the requests by refraining from routing the requests further. SIP proxy 104 also locally generates SIP 503 service unavailable messages with Retry-After and Reason headers. The Retry-After headers each include a time value calculated by SIP proxy 104 based on the refresh interval for refreshing registrations with a SIP endpoint. Core network entity 106, in response to receiving the 503 service unavailable messages, will refrain from sending SIP request messages to SIP endpoints $100_1$-$100_n$ at least until the time interval specified in the Retry-After header has passed, provided that core network entity 106 does not receive a new SIP REGISTER request message from one of the endpoints located behind NAT device 102.

In step 16, endpoint $100_n$ sends a SIP REGISTER request to core network entity 106 via NAT device 102 and SIP proxy 104. When NAT device 102 receives the SIP REGISTER request, NAT device 102 creates a new binding for the SIP endpoint that sent the REGISTER request. When SIP proxy 104 receives the new SIP REGISTER request, SIP proxy 104 creates a new NAT device to SIP endpoint correlation record and a registration cache entry for endpoint $100_n$ and deletes the existing NAT device to SIP endpoint correlation record and registration cache entry for endpoint $100_n$. It is important to note that SIP proxy 104 does not mark all of the endpoints behind NAT device 102 as reachable because new bindings have not yet been created for the remaining endpoint devices located behind NAT device. In step 17, SIP proxy 104 forwards the SIP request to core network entity 106. In step 18, core network entity 106 generates a SIP response and transmits the SIP response to SIP proxy 104. In step 19, SIP proxy 104 forwards the SIP response to NAT device 102. In step 20, NAT device 102 receives the response and uses the binding to forward the message to endpoint $100_n$.

In step 21, core network entity 106 generates and sends a SIP request directed to endpoint $100_n$ via SIP proxy 104. Because SIP proxy 104 created a new NAT to endpoint correlation record and registration cache entry for endpoint $100_n$, SIP proxy 104 forwards, in step 22, the SIP request to NAT device 102. NAT device 102 uses the previously created binding record to forward the message to endpoint $100_n$. Thus, in the example illustrated in FIG. 3, SIP proxy 104 reduces the number of unnecessary SIP requests transmitted in the network after a NAT reboot.

Figure 4A:
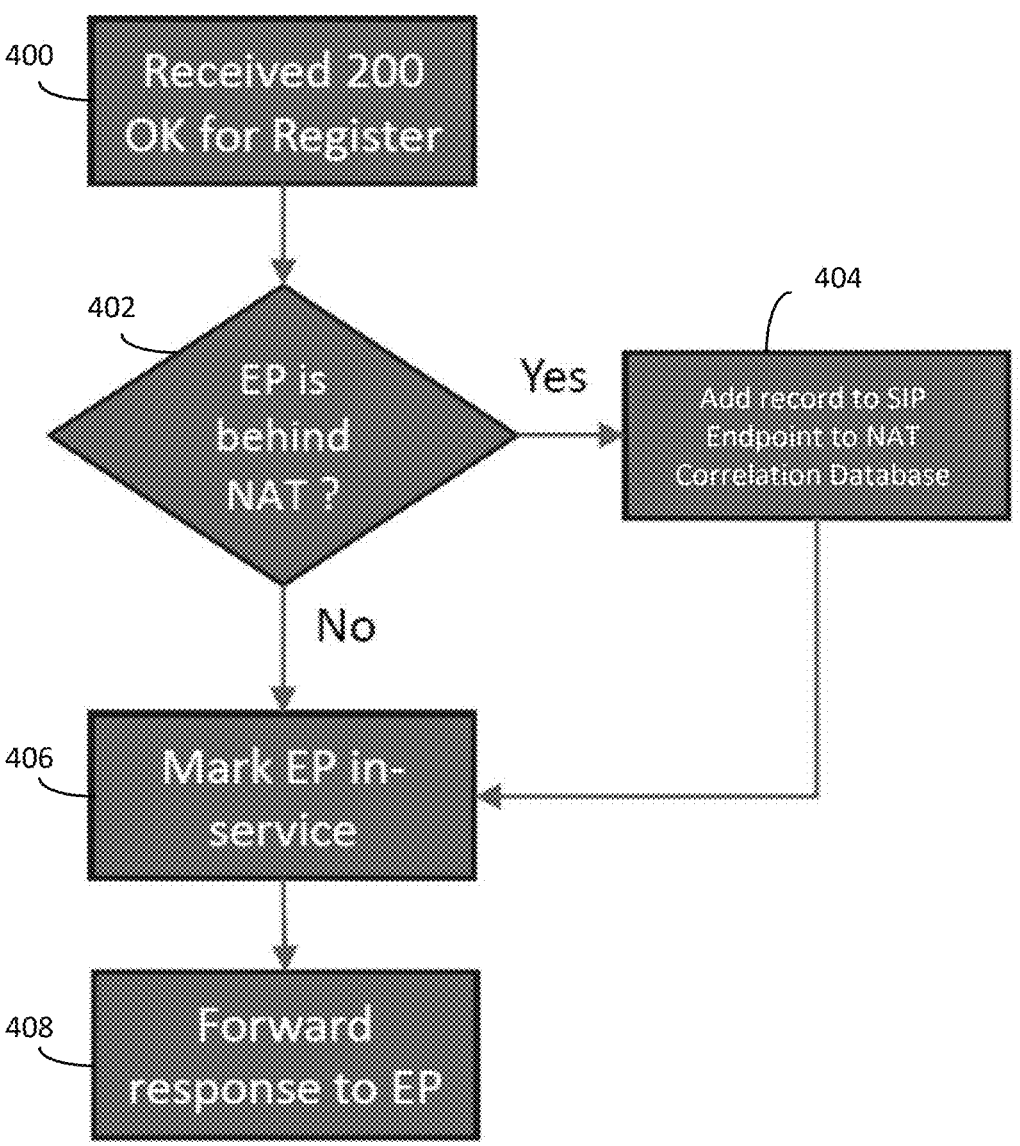
FIG. 4A is a flow chart illustrating an exemplary process performed by a SIP proxy in detecting endpoints located behind a NAT device.

FIG. 4A is a flow chart illustrating an exemplary process performed by a SIP proxy in detecting endpoints located behind a NAT device. Referring to FIG. 4A, in step 400, SIP proxy 104 receives a 200 OK message transmitted in response to a SIP REGISTER request. In step 402, SIP proxy 104 determines whether the endpoint is located behind a NAT device. As indicated above, determining whether an endpoint is behind a NAT device may include comparing the source IP address in the IP packet carrying the SIP message with the IP address in the first SIP Via header of the message. If the endpoint is determined to be behind a NAT device, control proceeds to step 404 where SIP proxy 104 adds a record to the SIP endpoint to NAT correlation database. After creating and adding the new record, control proceeds to step 406 where SIP proxy 104 marks the endpoint as available in the record.

Returning to step 402, if the endpoint is not determined to be behind the NAT device, control proceeds to step 406 where SIP proxy 104 marks the endpoint as being in service or available. Control then proceeds to step 408 where SIP proxy 104 forwards the 200 OK response message to the endpoint.

FIG. 4B is a flow chart illustrating an exemplary process performed by a SIP proxy in detecting a reboot or unavailability of the NAT device. Referring to FIG. 4B, in step 410, SIP proxy 104 determines that a request timeout has occurred. A request timeout is the expiration of a timer associated with a SIP request message transmitted by SIP proxy 104. In step 412, SIP proxy 104 determines whether the request message was directed towards a NAT device. If the request message was not directed towards a NAT device, control proceeds to step 414 where SIP proxy 104 sends a 408 response back to an originator of the request message.

Returning to step 412, if SIP proxy 104 determines that the request message was directed towards a NAT device, control proceeds to step 416 where SIP proxy 104 sets a "Potentially Rebooted" flag stored in memory of SIP proxy 104 to identify or classify the NAT device as having potentially rebooted. The NAT device flag may be associated with a NAT device identified in the NAT device to SIP endpoint correlation records and registration cache entries stored by SIP proxy 104 for SIP endpoints located behind the NAT device. Control then proceeds to step 418 where SIP proxy 104 sends SIP OPTIONS request messages to some of the endpoints located behind the NAT device. In one example, SIP proxy 104 selects endpoints with higher registration expiration values than other endpoints so that timeouts associated with the OPTIONS request messages are more likely to be caused by the rebooting or unavailability of the NAT device than expiration of a SIP registration of a SIP endpoint located behind a NAT device that has not rebooted and that is currently available.

In step 420, SIP proxy 104 determines whether an OPTIONS timeout has occurred. If an OPTIONS timeout has not occurred, control proceeds to step 422 where SIP proxy 104 resets or unmarks the NAT device "potentially rebooted" flag to indicate that the NAT device has not rebooted. If, in step 420, SIP proxy 104 determines that an OPTIONS timeout has occurred, control proceeds to step 424 where SIP proxy 104 marks or classifies all of the endpoints located behind the NAT device as unreachable, e.g., by setting the endpoint reachability flag in the database record illustrated in Table 2 to indicate that the endpoint is unreachable.

Figure 4C:
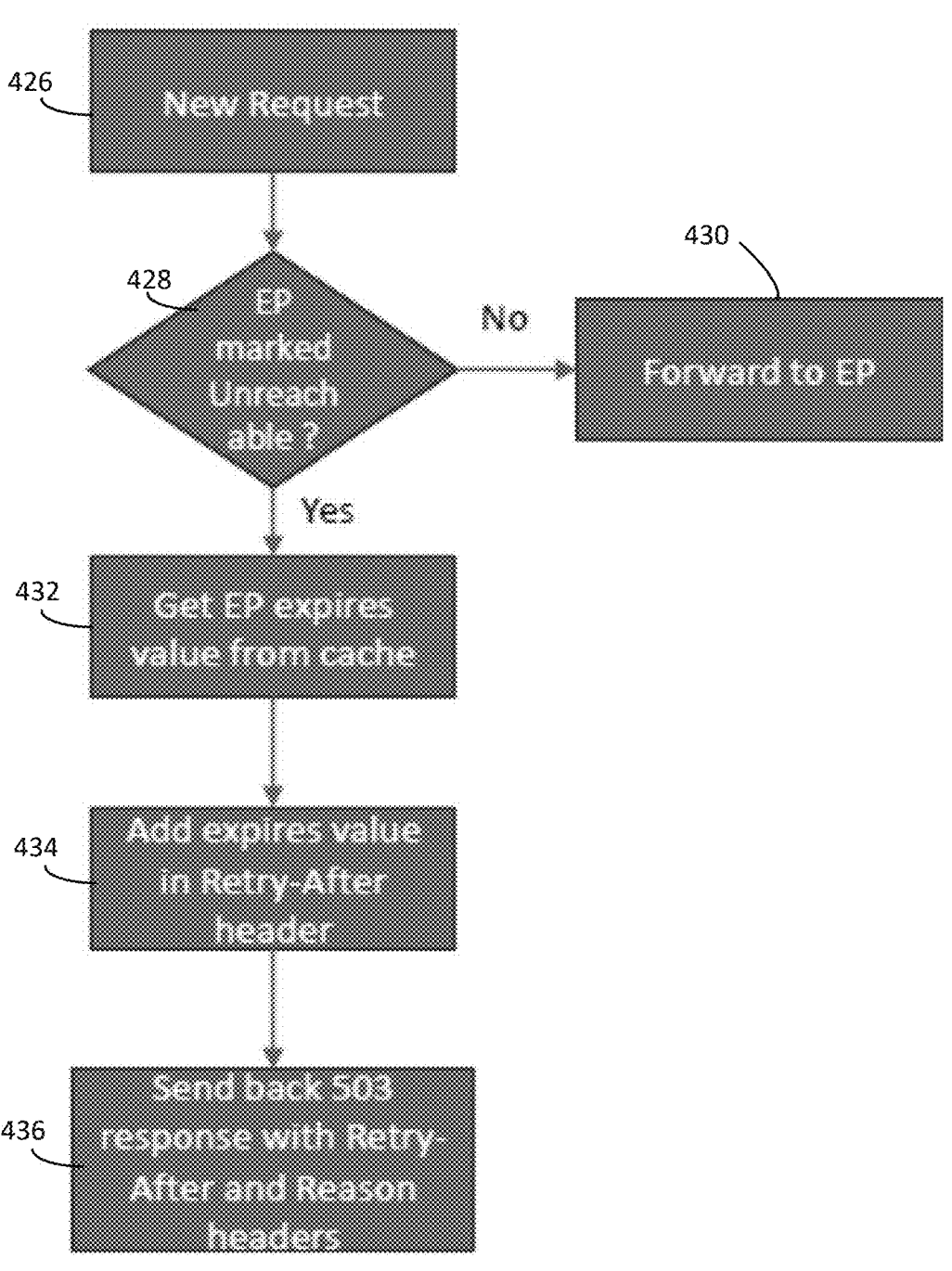
FIG. 4C is a flow chart illustrating an exemplary process performed by a SIP proxy in processing SIP requests directed to endpoints located behind a rebooted or unavailable NAT device.

FIG. 4C is a flow chart illustrating an exemplary process performed by a SIP proxy in processing SIP requests directed to endpoints located behind a rebooted or unavailable NAT device. Referring to FIG. 4C, in step 426, SIP proxy 104 receives a new SIP request message. In step 428, SIP proxy 104 determines whether the target endpoint of the SIP request message is marked as unreachable. If the endpoint is not marked as unreachable, control proceeds to step 430 where SIP proxy 104 forwards the message to the endpoint.

In step 428, if SIP proxy 104 determines that the endpoint is marked as unreachable, control proceeds to step 432 where SIP proxy 104 determines an endpoint expires value from its local cache. The endpoint expires value may be a value associated with the endpoint that indicates a time remaining for a SIP registration to expire. Control then proceeds to step 434 where SIP proxy 104 adds an expires value in the Retry-After header of a 503 response message. The expires value may be a time value that indicates the remaining time before the SIP registration is to be refreshed. Control then proceeds to step 436 where SIP proxy 104 sends a 503 response message with the Retry-After header and a Reason header to an originator of the request in step 426. Thus, rather than simply forwarding SIP requests to endpoints behind a NAT device that is not available to process the requests or that has rebooted and lost its bindings, the SIP proxy described herein determines when a NAT device is unavailable or has rebooted and limits SIP message traffic towards SIP endpoints located behind the unavailable or rebooted NAT device.

Figure 5:
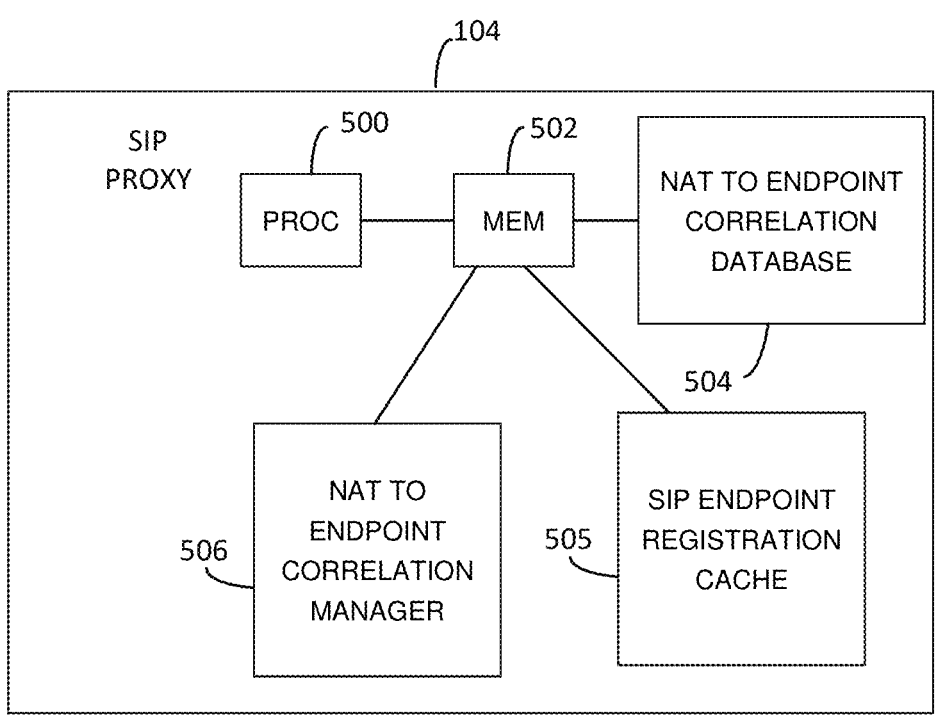
FIG. 5 is a block diagram illustrating an exemplary architecture for a SIP proxy that implements the subject matter described herein.

FIG. 5 is a block diagram illustrating an exemplary architecture for a SIP proxy that implements the subject matter described herein. Referring to FIG. 5, SIP proxy 104 includes at least one processor 500 and a memory 502. SIP proxy 104 further includes a NAT device to SIP endpoint correlation database 504 that stores correlation records for SIP endpoints located behind a NAT device. SIP proxy further includes a registration cache 505 that maintains registration information for registered SIP endpoints. An example of information that may be included such records and cache entries is illustrated above in Table 2. SIP proxy 104 further includes a NAT device to SIP endpoint correlation manager 506 that maintains the records in database 504 and performs the operations described herein for preserving network bandwidth by limiting traffic to SIP endpoints located behind a NAT that is unavailable or has rebooted. NAT device to SIP endpoint correlation manager 506 may be implemented using computer executable instructions stored in memory 502 and executed by processor 500. In one example, SIP proxy 104 may be a session border controller (SBC).

FIG. 6 is a flow chart illustrating an exemplary process performed by a SIP proxy in preserving network bandwidth during unavailability of a NAT device or after a reboot of a NAT device. Referring to FIG. 6, in step 600, the process includes receiving, by a SIP proxy, messages from SIP endpoints. For example, a SIP proxy, such as SIP proxy 104, may receive SIP messages, such as SIP REGISTER request messages from SIP endpoints, and at least some of the SIP endpoints may be located behind a NAT device.

In step 602, the process further includes determining, by the SIP proxy, that at least some of the SIP endpoints are located behind a NAT device. For example, a SIP proxy, such as SIP proxy 104, may determine that a SIP endpoint is located behind a NAT device by comparing the layer 3 source IP address to an IP address in the first Via header of the SIP message.

In step 604, the process includes, creating, by the SIP proxy, NAT device to SIP endpoint correlation records for the SIP endpoints located behind the NAT device. For example, a SIP proxy, such as SIP proxy 104 may create records that include the information illustrated above in Table 2 for each SIP endpoint determined to be located behind a NAT device. It should be noted that step 604 is optional, and, in an alternate implementation, SIP proxy 104 can access information for SIP endpoints located behind a NAT in a SIP registration cache maintained by SIP proxy 104.

In step 606, the process includes determining, by the SIP proxy, that the NAT device is potentially unavailable or has potentially rebooted. For example, a SIP proxy, such as SIP proxy 104, may determine that a NAT device has potentially rebooted by detecting response timeouts for messages sent to endpoints located behind a NAT device or by receiving a new SIP REGISTER request with different binding information for an endpoint located behind the NAT device.

In step 608, the process further includes testing, by the SIP proxy, reachability of at least some of the SIP endpoints located behind the NAT device and determining that the at least some of the SIP endpoints are unreachable. For example, a SIP proxy, such as SIP proxy 104, may transmit SIP OPTIONS request messages to at least some of the SIP endpoints located behind the NAT device and determine whether a timeout occurs for the SIP OPTIONS transactions.

In step 610, the process includes classifying, by the SIP proxy, all of the SIP endpoints located behind the NAT device as unreachable. For example, a SIP proxy, such as SIP proxy 104, may mark as unreachable in its correlation database records associated with a NAT that has rebooted or that is unavailable.

In step 612, the process includes rejecting, by the SIP proxy, SIP messages directed towards the SIP endpoints located behind the NAT device. For example, a SIP proxy, such as SIP proxy 104, may refrain from forwarding SIP request messages to SIP endpoints located behind a NAT that are marked as unreachable and may return error response messages with Retry-After and Reason headers to message originators. As indicated above, the Retry-After headers may include each include a time value that defines a time interval that the receiving entity should wait before sending SIP message traffic (retransmissions or new requests) to the endpoint located behind the NAT. Each of the Reason headers may include a value indicating that the endpoint is unreachable and/or that the NAT has rebooted or is unavailable.

Exemplary advantages of the subject matter described herein include early detection of NAT reboot events, inferring the loss of NAT bindings, and proactively reducing signaling to unreachable endpoints. These measures not only save network resources (bandwidth, compute, and memory resources) but also prevent undesired behavior due to mismatched NAT bindings. Using a Retry-After header in a SIP 503 response keeps core network entities from sending fresh requests to a proxy for a certain duration, which will further conserve resources, including those for auxiliary procedures, such as policy and accounting.

The disclosure of each of the following references is hereby incorporated herein by reference in its entirety.

REFERENCES

1. Rosenberg et al., SIP: Session Initiation Protocol, IETF RFC 3261 (June 2002).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for preserving network bandwidth during network address translation (NAT) device unavailability or after NAT device reboot, the method comprising:

receiving, by a session initiation protocol (SIP) proxy, messages from SIP endpoints;

determining, by the SIP proxy, that at least some of the SIP endpoints are located behind a NAT device;

determining, by the SIP proxy, that the NAT device is potentially unavailable or has potentially rebooted;

testing, by the SIP proxy, reachability of the at least some of the SIP endpoints located behind the NAT device and determining that the at least some of the SIP endpoints are unreachable;

in response to determining, from the testing, that the at least some of the SIP endpoints are unreachable, determining that the NAT device is unavailable or has rebooted, and classifying by the SIP proxy, all of the SIP endpoints located behind the NAT as unreachable; and rejecting, by the SIP proxy, SIP messages directed towards the SIP endpoints located behind the NAT device, wherein rejecting, by the SIP proxy, the SIP messages directed towards the SIP endpoints located behind the NAT device includes:

receiving, by the SIP proxy, the SIP messages directed towards the SIP endpoints located behind the NAT device;

refraining, by the SIP proxy, from forwarding the SIP messages directed towards the SIP endpoints located behind the NAT device; and transmitting, by the SIP proxy and to originators of the SIP messages directed towards the SIP endpoints located behind the NAT device, error response messages with Retry-After headers that each include a time value that defines a time interval that a receiving entity should wait before sending SIP message traffic to one of the SIP endpoints located behind the NAT device and a value indicating that the one of the SIP endpoints located behind the NAT device is unreachable and/or that the NAT device has rebooted or is unavailable.

2. The method of claim 1 wherein receiving messages from the SIP endpoints includes receiving SIP REGISTER request messages from the SIP endpoints.

3. The method of claim 2 wherein determining that the at least some of the SIP endpoints are located behind the NAT device includes:

comparing source Internet protocol (IP) addresses in layer 3 packets carrying the SIP REGISTER request messages to IP addresses in first SIP via headers of the SIP REGISTER request messages; and determining that the source IP addresses in the layer 3 packets carrying the SIP REGISTER request messages do not match the IP addresses in the first SIP via headers of the SIP REGISTER request messages.

4. The method of claim 1 comprising creating, by the SIP proxy, NAT device to SIP endpoint correlation records, wherein creating the records includes inserting, in each of the records, a layer 3 source Internet protocol (IP) address of a packet carrying a SIP message, a layer 4 source port number from the packet carrying the SIP message, an IP address, a port number, and a SIP instance identifier (ID) from a Contact header of the SIP message, and a call ID.

5. The method of claim 1 wherein determining that the NAT device is potentially unavailable or has potentially rebooted includes:

sending a message to one of the SIP endpoints located behind the NAT device and failing to receive a response to the message within a timeout period; and in response to failing to receive the response to the message within the timeout period, determining that the NAT device is potentially unavailable or has potentially rebooted.

6. The method of claim 1 wherein determining that the NAT device is potentially unavailable or has potentially rebooted includes:

receiving a SIP REGISTER request message from one of the SIP endpoints located behind the NAT;

using a first information from the SIP REGISTER request message to locate a NAT device to SIP endpoint correlation record or to access an entry for the one SIP endpoint in a SIP registration cache; and determining that a second information in the SIP REGISTER request message does not match information in the NAT device to SIP endpoint correlation record or the entry for the one SIP endpoint in the SIP registration cache.

7. The method of claim 6 wherein using the first information from the SIP REGISTER request message to locate the NAT device to SIP endpoint correlation record or the entry for the one SIP endpoint in the SIP registration cache includes using a layer 4 source port of a packet carrying the SIP REGISTER request message or a call identifier (ID) in the SIP REGISTER request message to locate the NAT device to SIP endpoint correlation record, determining that the call ID in the SIP REGISTER request message matches a call ID in the NAT device to SIP endpoint correlation record or the entry for the one SIP endpoint in the SIP registration cache, and determining that the second information in the SIP REGISTER request message does not match the information in the NAT device to SIP endpoint correlation record or the entry for the one SIP endpoint in the SIP registration cache includes determining that a SIP instance identifier or an Internet protocol (IP) address and port number in a SIP Contact header of the SIP REGISTER request message does not match a SIP instance identifier or an IP address and a port number in the NAT device to SIP endpoint correlation record or the entry for the one SIP endpoint in the SIP registration cache.

8. The method of claim 1 wherein testing the reachability of the at least some of the SIP endpoints located behind the NAT device includes:

transmitting SIP OPTIONS request messages to the at least some of the SIP endpoints located behind the NAT device; and determining that the NAT device is unavailable or has rebooted in response to detecting timeouts associated with the SIP OPTIONS request messages.

9. The method of claim 1 wherein the time value is determined by the SIP proxy based on a registration refresh interval.

10. The method of claim 1 wherein the SIP proxy comprises a session border controller (SBC).

11. A system for preserving network bandwidth during network address translation (NAT) device unavailability or after NAT device reboot, the system comprising:

a session initiation protocol (SIP) proxy including at least one processor and a memory;

a NAT device to SIP endpoint correlation manager implemented by the at least one processor for receiving messages from SIP endpoints, determining that at least some of the SIP endpoints are located behind a NAT device, determining that the NAT device is potentially unavailable or has potentially rebooted, testing reachability of the at least some of the SIP endpoints located behind the NAT device and determining that the at least some of the SIP endpoints are unreachable, in response to determining, from the testing, that the at least some of the SIP endpoints are unreachable, determining that the NAT device is unavailable or has rebooted and classifying all of the SIP endpoints located behind the NAT device as unreachable, and rejecting SIP messages directed towards the SIP endpoints located behind the NAT device, wherein rejecting the SIP messages directed towards the SIP endpoints located behind the NAT device includes:

receiving the SIP messages directed towards the SIP endpoints located behind the NAT device;

refraining from forwarding the SIP messages directed towards the SIP endpoints located behind the NAT device; and transmitting, to originators of the SIP messages directed towards the SIP endpoints located behind the NAT device, error response messages with Retry-After headers that each include a time value that defines a time interval that a receiving entity should wait before sending SIP message traffic to one of the SIP endpoints located behind the NAT device and a value indicating that the one of the SIP endpoints located behind the NAT device is unreachable and/or that the NAT device has rebooted or is unavailable.

12. The system of claim 11 wherein receiving the messages from the SIP endpoints comprises receiving SIP REGISTER request messages from the SIP endpoints.

13. The system of claim 12 wherein, in determining that the at least some of the SIP endpoints are located behind the NAT device, the NAT device to SIP endpoint correlation manager is configured to:

compare source Internet protocol (IP) addresses in layer 3 packets carrying the SIP REGISTER request messages to IP addresses in first SIP via headers of the SIP REGISTER request messages; and determine that the source IP addresses in the layer 3 packets carrying the SIP REGISTER request messages do not match the IP addresses in the first SIP via headers of the SIP REGISTER request messages.

14. The system of claim 11 wherein the NAT device to SIP endpoint correlation manager is configured to create NAT device to SIP endpoint correlation records and insert, in each of the records, a layer 3 source Internet protocol (IP) address from a packet carrying a SIP message, a layer 4 source port number from the packet carrying the SIP message, an IP address, a port number, and a SIP instance identifier (ID) from a Contact header of the SIP message, and a call ID.

15. The system of claim 11 wherein, in determining that the NAT device is potentially unavailable or has potentially rebooted, the NAT device to SIP endpoint correlation manager is configured to:

send a message to one of the SIP endpoints located behind the NAT device and fail to receive a response to the message within a timeout period; and in response to failing to receive the response to the message within the timeout period, determine that the NAT device is potentially unavailable or has potentially rebooted.

16. The system of claim 11 wherein, in determining that the NAT device is potentially unavailable or has potentially rebooted, the NAT device to SIP endpoint correlation manager is configured to:

receive a SIP REGISTER request message from one of the SIP endpoints located behind the NAT;

use a first information from the SIP REGISTER request message to locate a NAT device to SIP endpoint correlation record or an entry for the one SIP endpoint in a SIP registration cache; and determine that a second information in the SIP REGISTER request message does not match information in the NAT device to SIP endpoint correlation record or the entry for the one SIP endpoint in the SIP registration cache.

17. The system of claim 11 wherein, in testing the reachability of the at least some of the SIP endpoints located behind the NAT device, the NAT device to SIP endpoint correlation manager is configured to:

transmit SIP OPTIONS request messages to the at least some of the SIP endpoints located behind the NAT device; and determine that the NAT device is unavailable or has rebooted in response to detecting timeouts associated with the SIP OPTIONS request messages.

18. The system of claim 11 wherein the time value is determined by the SIP proxy based on a registration refresh interval.

19. The system of claim 11 wherein the SIP proxy comprises a session border controller (SBC).

20. A non-transitory computer readable medium having stored thereon executable instructions that when executed by a processor of a computer control the computer to perform steps comprising:

receiving, by a session initiation protocol (SIP) proxy, messages from SIP endpoints;

determining, by the SIP proxy, that at least some of the SIP endpoints are located behind a network address translation (NAT) device;

determining, by the SIP proxy, that the NAT device is potentially unavailable or has potentially rebooted;

testing, by the SIP proxy, reachability of the at least some of the SIP endpoints located behind the NAT device and determining that the at least some of the SIP endpoints are unreachable;

in response to determining, from the testing, that the at least some of the SIP endpoints are unreachable, determining that the NAT device is unavailable or has rebooted and classifying, by the SIP proxy, all of the SIP endpoints located behind the NAT device as unreachable; and rejecting, by the SIP proxy, SIP messages directed towards the SIP endpoints located behind the NAT device, wherein rejecting, by the SIP proxy, the SIP messages directed towards the SIP endpoints located behind the NAT device includes:

receiving, by the SIP proxy, the SIP messages directed towards the SIP endpoints located behind the NAT device;

refraining, by the SIP proxy, from forwarding the SIP messages directed towards the SIP endpoints located behind the NAT device; and transmitting, by the SIP proxy and to originators of the SIP messages directed towards the SIP endpoints located behind the NAT device, error response messages with Retry-After headers that each includes a time value that defines a time interval that a receiving entity should wait before sending SIP message traffic to one of the SIP endpoints located behind the NAT device and a value indicating that the one of the SIP endpoints located behind the NAT device is unreachable and/or that the NAT device has rebooted or is unavailable.

* * * * *